July 25, 1939. R. E. FOSDICK 2,166,988
COMPOUND READING LENS
Filed June 1, 1936

INVENTOR,
Robert E. Fosdick,
BY Howard D. Smith
His ATTORNEY

Patented July 25, 1939

2,166,988

UNITED STATES PATENT OFFICE 2,166,988

COMPOUND READING LENS

Robert E. Fosdick, Dayton, Ohio

Application June 1, 1936, Serial No. 82,738

2 Claims. (Cl. 88—39)

This invention relates to new and useful improvements in a compound reading lens.

Heretofore, lenses for reading printed matter such as periodicals, charts and books have been of the long cylindroidal kind which magnify in one direction only. These lenses, which included segments of the cylindrical lens type placed at right angles with the long cylinder lens, gave a magnification in opposite directions. There are dead or blind spots where segments are joined together, making impossible a continuous reading or observation of the object under observation without moving the lens either to the right or left to take up the displacement of these blind spots. In previous types of lenses one has to look directly through the center of the optics or lens, since at any angle beyond the optical centers one gets sufficient aberration or distortion to interfere with or destroy a perfect vision of the objects under observation.

It is one of the principal objects of my invention to provide a lens of greater length than width to make it possible for a person to read columns of figures, books, newspapers, charts or numerals, horizontally without blind spots, distortion and chromatic aberration.

A further object of my invention is to provide a lens which gives a clear, flat field of the observed field of view, and equal magnification the full length of the lens.

Another object of my invention is the provision of a lens having optical qualities that will enable an observer to look through it from an angle of forty-five degrees from either end and obtain a clear and uniform view of the object under observation.

A further object of my invention is the provision of a lens system including a lens that is whole and in one piece, without any divisions or segments, and without blind spots or aberration.

My invention is particularly adapted to weighing scales for magnifying indications, graduations and computations.

Other important and incidental objects will be brought out in the following specification and particularly set forth in the subjoined claims.

Figure 8:
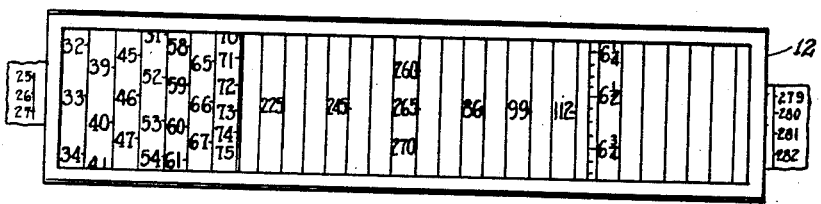
Figure 3:
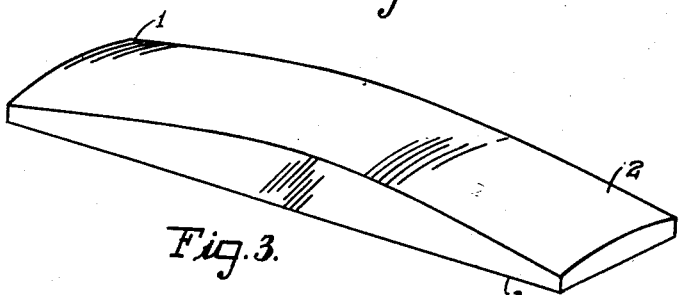
Figure 4:
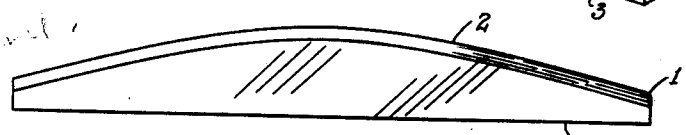
Figure 5:
Figure 6:
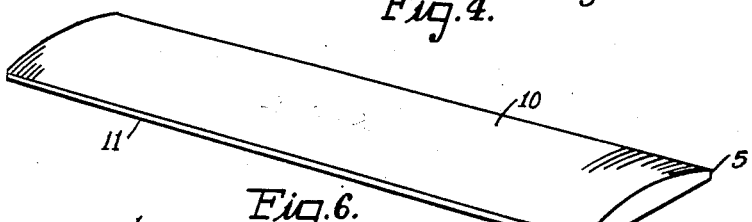
Figure 7:
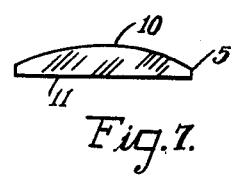
Figure 1:
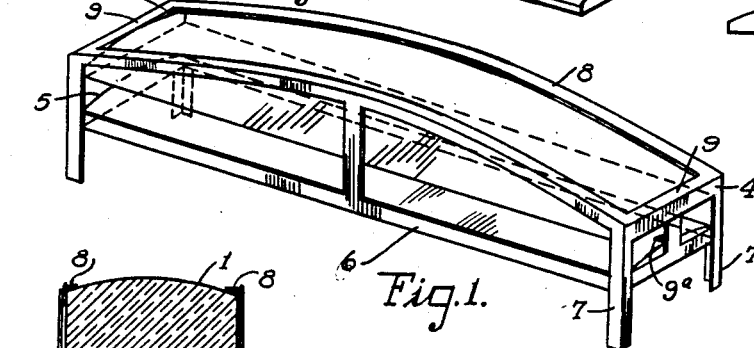
Figure 2:
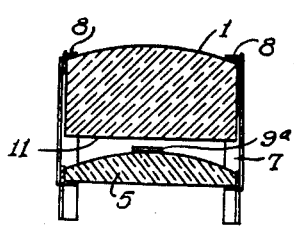

In the accompanying drawing illustrating my invention, Figure 1 is a perspective view of my compound reading lens unit. Figure 2 is a cross-sectional view taken through the same. Figure 3 is a perspective view of the upper oblong lens in said unit. Figure 4 is a side view of said lens. Figure 5 is an end view thereof. Figure 6 is a perspective view of the lower oblong lens in said unit. Figure 7 is an end view of the lower lens. And Figure 8 is a plan view of a portion of a weighing scale chart, showing equal magnification of the designations the full length of the lens.

Referring to the accompanying drawing for a detailed description of my invention, the numeral 1 designates an oblong lens, much longer than it is wide, and having a convex surface 2 ground with intersecting longitudinal and transverse curves of different radii. In Figures 3, 4 and 5 the numeral 3 designates the other surface of the lens, which in the present instance is flat.

The lens 1 is mounted in a holder 4 above and out of contact with a lens 5. The holder in the present instance comprises a lower rectangular frame within which the lower lens 5 is fitted. This frame 6 is secured at its corner portions to legs 7 which rise well above them to receive the ends of two side, bowed members 8, 8 which follow the curvature of the convex portion of the lens 1. The upper ends of the legs 7 and the ends of the bowed member 8 are connected by straight end members 9, 9 from which ears 9a project over the ends of the lens 5. These members 9 co-operate with the curved side members 8, 8 in supporting the oblong lens 1 a sufficient distance above the lens 5 to leave an air space between them. The degree of separation of the lenses 1 and 5 is determined in fractions by the structure of the glass being used. When a proper air spacing is obtained between these two lenses, the object under observation is brought to the eye as an enlarged image in a flat field free from achromatic or spherical aberration. This is due to the refractive index of the two lenses. There is thus presented a clear view of that object, whatever its nature, without any blind spots in the field of view.

The lens 5 is a rectangular one with a surface 10 ground with a curve the short way of the lens, in connection with a fractional curve plus the long way of the lens. By "fraction of a curve" I mean a section of a curve. This surface 10 of the lens 5 faces the flat surface 3 of the lens 1, its other surface 11 being flat in the present instance. The density and index of refraction of the glass controls the fractional curves in order to obtain the required results in a lens free from achromatic or spherical aberrations and to give a clear, flat field of view.

In Figure 8 I have illustrated a weighing scale chart 12, showing how the numerals thereon appear when read from various angles by my lens unit. As will be observed, my lens unit gives equal magnification the full length of the lens.

Having described my invention, I claim:

1. A magnifying device comprising a holder frame having a bowed rectangular upper portion and a flat rectangular lower portion, leg portions joining the ends of said upper and lower frame portions, an oblong lens mounted in the upper portion of said frame and having a convex outer surface ground with intersecting longitudinal and transverse curves of different radii, a second oblong lens mounted in the lower portion of said frame, said lenses being separated from each other to leave an air filled refracting space, said lenses being substantially co-extensive and their transverse axes being substantially parallel, the second lens having a convex surface in said space ground with a cylindroid curve transversely thereof and a fractional curve longitudinally thereof, said lenses being arranged in such relation that said second lens is closest to the object under observation, the image of which is viewed through said first lens, whereby the light rays passing from said object to the observer's eye are first acted upon by said second lens and subsequently by said first lens, said lenses co-acting to give sufficient lateral magnification to enable objects magnified to be clearly seen through said first lens at an angle of 45° endwise from a perpendicular to the longitudinal axis thereof.

2. A magnifying device comprising a holder frame having a rectangular upper portion and a rectangular lower portion, leg portions joining the ends of said upper and lower frame portions, an oblong lens mounted in the upper portion of said frame and having a convex outer surface ground with intersecting longitudinal and transverse curves of different radii, a second oblong lens mounted in the lower portion of said frame, said lenses being separated from each other to leave an air filled refracting space, said lenses being substantially co-extensive and their transverse axes being substantially parallel, the second lens having a convex surface in said space ground with a cylindroid curve transversely thereof and a fractional curve longitudinally thereof, said lenses being arranged in such relation that said second lens is closest to the object under observation, the image of which is viewed through said first lens, whereby the light rays passing from said object to the observer's eye are first acted upon by said second lens and subsequently by said first lens, said lenses co-acting to give sufficient lateral magnification to enable objects magnified to be clearly seen through said first lens at an angle of 45° endwise from a perpendicular to the longitudinal axis thereof.

ROBERT E. FOSDICK.